United States Patent Office 3,502,620
Patented Mar. 24, 1970

3,502,620
BRANCHED POLYESTERS CONTAINING
TERMINAL CARBOXYL GROUPS
John Richard Caldwell, Kingsport, Tenn., assignor to Eastman Kodak Company, Rochester, N.Y., a corporation of New Jersey
No Drawing. Filed May 11, 1967, Ser. No. 637,623
Int. Cl. C08g 17/00, 17/08
U.S. Cl. 260—75                                    8 Claims

ABSTRACT OF THE DISCLOSURE

Branched polyesters having improved adhesive properties and containing terminal carboxyl groups are prepared by reacting [A] a linear polyester of (1) at least one glycol and at least one dicarboxylic acid, (2) at least one hydroxycarboxylic acid, or (3) a mixture of at least one glycol, at least one dicarboxylic acid, and at least one hydroxycarboxylic acid; and [B] at least one polycarboxylic acid having 3 to 6 carboxyl groups.

---

The present invention relates to fusible, high molecular weight, branched polyesters. In one of its more specific aspects, the present invention relates to fusible, high molecular weight, branched polyesters containing terminal carboxyl groups and to methods for the preparation of such polyesters.

Branched polyesters are known in the art and have generally heretofore been prepared by the reaction of minor concentrations of a polyfunctional compound with the diol and dicarboxylic acid normally employed in the formation of the polyester. Such polyfunctional compounds have been polyols containing three or more reactive hydroxyl groups and polycarboxylic acids containing three or more reactive carboxyl groups. Of these two types of polyfunctional compounds, the polycarboxylic acids have been deemed more reactive and have resulted in cross-linked polyesters when employed in more than minute concentrations in the formation of the polyester. However, the such polyesters, even when containing very low concentrations of the polycarboxylic acid, tend to be extremely unstable at temperature necessary in the melt-fabrication of high molecular weight polyesters.

Therefore, there is a considerable need in the polymer industry for fusible, high molecular weight, branched polyesters which contain a substantial concentration of free carboxyl groups, which are not intractable or insoluble, and which form stable melts. These polyesters would be extremely valuable because of their ability to undergo controlled post-polymerization reactions at the carboxyl group and because the presence of the carboxyl group, particularly at higher concentrations, would impart valuable adhesion properties to the polymer.

It is an object of this invention to provide branched polyesters containing terminal carboxyl groups.

It is another object of this invention to provide polyesters which are fusible and are of sufficient high molecular weight to be extruded into films and spun into fibers.

It is a further object of this invention to provide polyesters which have greatly improved adhesion to various surfaces, particularly surfaces of metal.

It is a still further object of this invention to provide polyesters which are sufficiently stable in the melt to permit melt-fabrication thereof.

It is a still further object of this invention to provide a process for preparing fusible, high molecular weight, branched polyesters containing terminal carboxyl groups.

Other objects of this invention will appear herein.

These and other objects are attained through the practice of this invention, at least one embodiment of which provides a fusible, high molecular weight, branched polyester of [A] a linear polyester of (1) at least one glycol and at least one dicarboxylic acid, (2) at least one hydroxycarboxylic acid, or (3) a mixture of at least one glycol, at least one dicarboxylic acid, and at least one hydroxycarboxylic acid; and [B] at least one polycarboxylic acid having 3 to 6 carboxyl groups, said branched polyester containing branched molecules terminated with from 2 to 10 mole percent, based on the carboxylic acid in said linear polyester, of carboxyl groups, said branched molecules comprising at least 50 percent by weight of said branched polyester.

In a preferred embodiment of the present invention, the fusible, branched polyesters have a molecular weight of at least 4000 and contain no measurable end-groups (by infrared spectroscopy) other than carboxyl groups.

Another embodiment of this invention provides a process for preparing the above-described fusible, high molecular weight, branched polyester, said process comprising reacting, under acidolysis conditions at a temperature in the range of from about 100° C. to about 320° C. until an equilibrium state is reached, [A] the above-described linear polyester and [B] the above-described polycarboxylic acid.

The novel branched polyesters of the present invention are characterized by their high molecular weight which allows their preparation into useful fibers and films; their adhesion properties; their post-polymerization reactivity which is due to the high concentration of carboxyl groups; and their melt stability which is believed to result from the substantial absence of any end-group other than the carboxyl group.

The branched polyesters of the present invention are prepared by the reaction under acidolysis conditions of a linear polyester and an excess, over the terminal hydroxyl groups, of a polycarboxylic acid having 3 to 6 carboxyl groups. The process is based on the discovery that under conditions more specifically outlined hereinbelow and generically referred to as acidolysis conditions, polycarboxylic acids not only react with the terminal groups of a polyester molecule but, furthermore, cause chain scission, transesterification, and formation of carboxyl groups, which may be schematically illustrated by the following reaction:

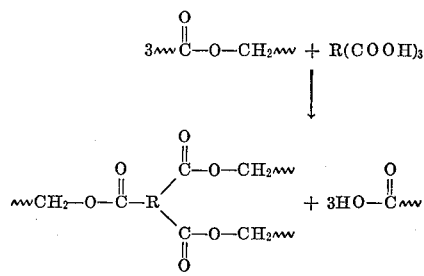

wherein R is the carboxyl-free nucleus of, in the illustrated instance, a tricarboxylic acid.

Although the polycarboxyl acid can undoubtedly also react with any terminal hydroxyl groups of the linear polyester, the use of excess concentrations of the polycarboxylic acid causes the described scission reaction to completely overshadow any reaction occurring at the terminal groups and causes the formation of branched polyesters containing terminal carboxyl groups. As a result of employing polycarboxylic acids in excess over the concentration required to cause reaction with all hydroxyl groups, the molecular weight of the resulting branched polyester is lower than the molecular weight of the starting linear polyester. This is greatly surprising since the use of polycarboxylic acids, whether in combination with dicarboxylic acids or glycols or whether employed with a preformed polyester, has been believed previously to cause chain extension and through such mechanism to the formation of cross-linked, insoluble products. The polycarboxylic acid employed in the present invention should, therefore, be employed in sufficient concentrations to prevent the molecular weight of the polyester from increasing. Whether a certain concentration of polycarboxylic acid when employed under acidolysis conditions meets this requirement can, of course, be readily established experimentally. Preferably, the concentration should be in the range of 2 to 10 mole percent based on the carboxylic acid in the linear polyester.

Since the branched polyesters of the present invention are of particular utility when of high molecular weight, it will be apparent, in view of the foregoing discussion, that the starting linear polyesters should also be of high molecular weight. Linear polyesters having molecular weights of at least 4000 and preferably in the range of 10,000 to 100,000 can be suitably employed.

The acidolysis resulting in the formation of the novel branched polyesters may be carried out in the temperature range of from about 100° C. to about 320° C. It is preferred to carry out the reaction in the range of 220–260° C. At temperatures below about 200° C., it may be advantageous to conduct the reaction in the presence of an acid catalyst such as sulfuric acid, an aryl or alkyl sulfonic acid, phosphoric acid, etc. At temperatures above 200° C. and particularly above 220° C., acid catalysts are not necessary, although the reaction may be facilitated by compounds of titanium, tin, aluminum, zirconium, and other polyvalent metals. The reaction is generally continued until an equilibrium state has been reached. Since the quantity of the carboxylic acid added to the polyester is in excess of the terminal hydroxyl groups and the reaction equilibrium is overwhelmingly in favor of the reaction product as schematically illustrated above, substantially all of the end-groups of the resulting products are carboxyl groups.

The actual time required for the acidolysis reaction to reach equilibrium depends upon factors such as the nature of the polycarboxylic acid and the linear polyester, the temperature, the effects of catalysts, and similar reaction conditions. Characteristically, the existence of equilibrium conditions is ascertained by continuously measuring the change in the melt viscosity of the reaction mixture as the reaction proceeds and establishing the existence of a plateau in the melt viscosity. In a typical instance, using a temperature of about 220° C. to about 250° C., a reaction time of about two to three hours is required.

The reaction can be conducted in bulk or in the presence of inert solvents or reaction media, the latter being particularly useful in the case of polyesters having melting points above 260° C. Useful reaction media include cresol, o-phenylphenol, chlorinated polyphenyls, diphenyl, diphenylether, and chlorinated naphthalenes.

The linear polyesters which are employed to produce the branched polyesters of the present invention can be any linear polyester having a molecular weight of at least 4000. Polyesters of this type are well known in the art and may be prepared by such methods as the ester-interchange of a glycol with a dialkyl ester of a dicarboxylic acid, the condensation of a dicarboxylic acid with a glycol, or by self-condensation of hydroxy carboxylic acids. Linear copolyesters in which more than one dicarboxylic acid, more than one glycol, or more than one hydroxy acid are employed in the polyester formation also can be employed. Similarly, mixtures of hydroxy carboxylic acids, dicarboxylic acids, and glycols can be employed.

The glycols which can be employed to prepare the linear, high molecular weight polyester are preferably free of ethylenic unsaturation and can have an aliphatic, cycloaliphatic, or aromatic structure. Suitable aliphatic glycols include the polymethylene glycols having the formula $HO(CH_2)_nOH$ where $n$ is from 2–20, such as ethylene glycol; propylene glycol; 1,4-butanediol; 1,5-pentanediol; 1,6-hexanediol; and decamethylene glycol; secondary glycols such as 1,2-propanediol; 1,3-butanediol; 2,3-butanediol; 1,5-hexanediol; and 2-ethyl-1,3-hexanediol; and branched-chain glycols such as 2,2-dialkyl-1,3-propanediol; 2-methyl-1,4-butanediol; 3-methyl-1,6-hexanediol; and 2,2,4-trimethyl-1,3-pentanediol.

Suitable cycloaliphatic glycols include 1,2-cyclohexanedimethanol; 1,2-dihydroxycyclohexane; 1,3-cyclohexanedimethanol; 1,3-dihydroxycyclohexane; 1,4-cyclohexanedimethanol; 1,4-dihydroxycyclohexane; the various norcamphanediols; the various norcamphanedimethanols; and 2,2,4,4-tetraalkyl-1,3-cyclobutanediol. Suitable aromatic glycols include o-, m-, and p-xylylene glycols.

Glycols containing hetero atoms in the molecule can also be employed in the formation of the linear polyester and include such materials as polyoxyalkylene glycols having 2–30 repeating oxyalkylene groups, the oxyalkylene groups of which have 2–4 carbon atoms, such as polyethylene glycol, polypropylene glycol, poly(ethylene-propylene) glycol, and poly(ethylenebutylene) glycol. Other suitable ether glycols include 4,4'-dihydroxydibutyl ether and p-phenylenedioxydiethanol.

The dicarboxylic acids employed in preparing the linear polyester are preferably free of ethylenic unsaturation and can be aliphatic, cycloaliphatic, or aromatic in structure. In the direct condensation method of preparing the linear polyester, the free acid may be employed; while in the ester-interchange method, the acid in the form of its phenyl or lower alkyl ester may be employed. It will be understood that the acids hereinafter disclosed can be employed as such or in the form of the described esters to prepare suitable polyesters. Suitable aliphatic dicarboxylic acids include malonic acid, succinic acid, glutaric acid, adipic acid, pimelic acid, suberic acid, azelaic acid, sebacic acid, and any of the other polymethylenedicarboxylic acids having up to 20 carbon atoms per molecule.

Suitable branched-chain aliphatic dicarboxylic acids include dimethyl malonic acid; methyl succinic acids; 2,2-dimethyl succinic acid; 2-methyl adipic acid; and the like. Suitable cycloaliphatic acids include cyclohexane dicarboxylic acids; 2,3-norcamphanedicarboxylic acid; and 1,3-cyclopentane dicarboxylic acid. Aromatic acids which can be employed in the preparation of suitable polyesters include phthalic acid, isophthalic acid, terephthalic acid, 3-chloroisophthalic acid, homophthalic acid, and the various naphthalene dicarboxylic acids.

Another type of acid which can be employed for the preparation of the linear polyester are those having one or more ether groups. Examples of such acids are diglycolic acid, 3,3'-oxydipropionic acid, and p-phenylenedioxydiacetic acid. Dicarboxylic acids derived from fatty acids such as dimerized oleic acid can also be employed in the formation of suitable linear polyesters.

As indicated above, the polyester can be prepared by the self-condensation of hydroxy carboxylic acids. Typical of such compounds are glycolic acid, lactic acid, hydroxypivalic acid, 6-hydroxphexanoic acid, 4-hydroxymethyl-cyclohexane carboxlic acid, and the like.

The polycarboxylic acids used to react with the linear polyester are those having 3 to 6 carboxyl groups and preferably 3 or 4 carboxyl groups. Suitable polycarboxylic acids include trimesic acids; 2,4,2',4'-diphenyltetracarboxylic acid; 2,4,4'-diphenyltricarboxylic acid; 2,4,3'-diphenylethertricarboxylic acid; 1,3,5,7 - naphthalenetetracarboxylic acid; 1,3,6 - naphthalenetricarboxylic acid; and 5-carboxymethoxyisophthalic acid. The aromatic rings can be substituted with halogen, as represented by chlorotrimesic acid and 2-chloro-4,2',4'-diphenylethertricarboxylic acid.

It is preferred to use temperatures below about 220° C. when employing polycarboxylic acids which form cyclic anhydrides since there may be a tendency for anhydride formation with subsequent loss of carboxyl function at higher temperatures. Such cyclic anhydride-forming acids include trimellitic acid; pyromellitic acids; 3,4,3',4' - benzophenonetetracarboxylic acids; butane-1,2,3,4 - tetracarboxylic acid; diphenyl - 2,3,5,6 - tetracarboxylic acid; diphenyl-3,4,3',4'-tetracarboxylic acid; and the like. However, these polycarboxylic acids can be used at higher temperatures if they are employed in the form of certain derivatives. For instance, the anhydride of a tricarboxylic acid may be reacted with a glycol or triol to form a compound containing free carboxyl groups. When used in the process of the present invention, this compound functions essentially as a polycarboxylic acid and produces branched polyesters. Similarly useful compounds may be obtained by treating N,N'-monosubstituted diamines with tricarboxylic acid anhydrides.

Polycarboxylic acids having three or more carboxyl groups are readily obtainable by the hydrolysis of compounds derived by cyanoethylation of certain active hydrogen-containing compounds. Such acids include 4-phenyl-4-carboxypimelic acid, the preparation of which is described by E. F. Koelsch, Journal of Organic Chemistry, vol. 25, p. 165 (1960); 2,2,6,6-tetracarboxyethylcyclohexanone and 4-carboxy-4-carboxyethylpimelic acid, the preparations of which are described by H. A. Bruson, J.A.C.S., vol. 64, p. 2850 (1942); and hexacarboxyethylcyclopentane which is described, along with other acids, in J.A.C.S., vol. 64, p. 2457 (1942).

It was discovered that the branched polyesters prepared by the process of the present invention are fusible and soluble in organic solvents. In addition, these branched polyesters containing terminal carboxyl groups can be maintained at temperatures above their melting points for substantial periods of time (e.g., six hours or more) without evidence of either degradation or cross-linking. As indicated herein above, with regard to previous branched polyesters, it would be expected that prolonged heating would produce a cross-linked, infusible polymer. This suprising melt stability in combination with the high molecular weight makes the novel polyesters of the present invention useful for the production of fibers, films, molded objects, and other extruded shapes. The novel, branched polyesters can be shaped and processed by methods heretofore developed for polyesters. Thus, fibers can be melt-spun, drafted, and heat-set by usual methods. Films can be melt-extruded, drawn, and biaxially oriented.

Since the polyesters contain free carboxyl groups that function as reaction sites, they can be reacted with isocyanates, epoxy resins. formaldehyde resins, polyvalent metal ions, amines, and other reagents capable of reacting with carboxyl groups in order to prepare products having particular properties. In addition, the presence of the free carboxyl groups causes a modification of the surface properties of shaped articles prepared from the branched polyester in that the adhesion of inks, sizes and other surface treatments is improved. Fibers prepared from the branched polyesters have improved affinity for basic dyes, disperse dyes, and premetallized dyes.

The fusible, branched polyesters of this invention are particularly useful as melt adhesives. The carboxyl groups greatly improve the adhesion and bond strength of the polyester to the substrate and particularly effective bonds are obtained with metal substrates. The wetting and adhesive properties of other substrates such as fibers, paper, wood, plastics, leather, and thermosetting resins can be improved by the branched polyesters of this invention. When used as melt adhesives, the branched polyesters can be melted and applied to the surfaces to be bonded. Alternatively, the polyesters in the form of granules, powder, or films can be placed between the two surfaces. Heat and pressure are applied then to form the bond.

Pigments, fillers, plasticizers, and dyes can be incorporated into the polyesters. Reactive compounds, resins, or pigments can be mixed with the polyesters prior to bond formation. Heat and pressure are applied then to form the bond.

The following examples will serve to more fully illustrate the novel features and practices of this invention. However, it will be understood that they are but examples of specific embodiments of this invention and, therefore, not in limitation thereof. Parts and percentages are by weight and temperatures are in degrees centigrade, unless otherwise specified. The term I.V., as used herein, denotes the inherent viscosity of the polyester so defined and is determined at 25° C. using 0.25 gram of polymer per 100 ml. of a 60:40 mixture of phenol:tetrachloroethane.

EXAMPLE 1

Poly(ethylene terephthalate) having an I.V. of 1.1 is heated at 280° C. with 5 mole percent of trimesic acid, based on the terephthalic acid present in the polyester. The mixture is stirred at 280° C. in a nitrogen atmosphere for a period of 0.5 hours. The viscosity of the melt decreases during the reaction and a branched polyester containing terminal carboxyl groups and having an I.V. of 0.7 is obtained. The polyester shows improved adhesion on metals. Fibers prepared from the polyester dye well with basic dyes.

EXAMPLE 2

A polyester made from equimolar concentrations of terephthalic acid and 1,4-cyclohexanedimethanol having an I.V. of 0.8 is heated with 5 mole percent of trimesic acid, as described in Example 1, using a temperature of 310° C. Fibers prepared from the resulting branched polyester can be dyed with basic dyes.

EXAMPLE 3

Two molecular proportions of trimellitic anhydride and one molecular proportion of neopentyl glycol are heated and stirred at 100° C. for 2 hours, to give the tetracarboxy diester having the structure:

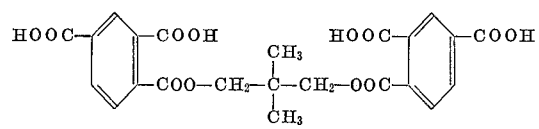

One gram of the above compound and nine grams of a linear polyester are heated and stirred in nitrogen at 220° C. for three hours. The linear polyester has an I.V. of 0.82 and is made from 0.5 mole of terephthalic acid, 0.5 mole of isophthalic acid, and 1.0 mole of tetramethylene glycol. The acidolysis product has an I.V. of 0.47. Heating in the melt for several hours longer does not cause cross-linking.

The acidolysis reaction is repeated, using the tetracarboxy derivative obtained by reacting two moles of trimellitic anhydride with one mole of hexamethylene glycol. The resulting branched polyester has an I.V. of 0.52 and exhibits greatly improved adhesion on iron and aluminum.

EXAMPLE 4

A linear polyester is made from 0.6 mole of terephthalic acid, 0.4 mole of isophthalic acid, and 1.0 mole of tetramethylene glycol. The polyester has an I.V. of 1.2.

A tetracarboxylic acid derivative is made by heating two moles of trimellitic anhydride with one mole of polyethylene glycol having a molecular weight of 200.

A mixture of 98.5 grams of the linear polyester with 1.5 grams of the tetracarboxyl compound is heated at 210° C. for 2 hours until acidolysis is complete. Films of the resulting branched polyester, about 1-3 mils thick, are prepared by solvent casting. The resulting branched polyester film is placed between two steel strips 1 inch wide and over-lapped ½ inch. The assembly is placed in a spring clamp and heated at 200° C. for five minutes. For comparison, similar samples are made using the original linear polyester. The samples are tested for tensile shear strength on a standard Baldwin machine.

|  | Strength at 71°, p.s.i. |
|---|---|
| Original linear polyester | 1730 |
| Carboxylated polyester | 2560 |

It is seen that the presence of the carboxyl groups results in a large increase in bond strength. This branched polyester containing terminal carboxyl groups also has excellent adhesion on aluminum, zinc, copper, textiles, leather, and wood.

EXAMPLE 5

A polyester is made having the composition 0.5 mole of terephthalic acid; 0.5 mole of isophthalic acid; and 1.0 mole of 1,4-cyclohexanedimethanol. The I.V. of the linear polyester is approximately 0.8.

Ninety-eight parts of the linear polyester is heated in the melt with two parts of the tetracarboxy compound described in Example 4. Aluminum test strips are bonded with the linear polyester and with the branched, carboxylated polyester. The samples are tested at 71° C.

|  | Strength at 71°, p.s.i. |
|---|---|
| Original linear polyester | 1140 |
| Branched, carboxylated polyester | 1453 |

It is seen that the carboxylated polyester forms a bond that is approximately 30 percent stronger. The performance at 71° C. is important because this represents the conditions used for pasteurization of beverage cans. The subject polyester has utility as a hot-melt adhesive for bonding the seams in cans of this type.

EXAMPLE 6

A polyester having an I.V. of about 0.70 was made from 1.0 mole of terephthalic acid; 0.5 mole of 1,4-cyclohexanedimethanol; and 0.5 mole of 2,2,4,4-tetramethyl-1,3-cyclobutanediol. It was stirred at 250° C. for five hours with 2.5 mole percent of 2,2,6,6-tetra(carboxyethyl)cyclohexanone, based on the terephthalic acid in the polyester. The resulting branched polyester has an I.V. of 0.42.

This branched polyester has excellent adhesion on aluminum, iron, copper, brass, zinc, and nickel. It is particularly useful as a melt adhesive for bonding the seams of food and beverage cans since it retains its strength at 100-110° C. and has good resistance to boiling water.

EXAMPLE 7

Poly(ethylene terephthalate) having an I.V. of 0.9 is dissolved in chlorophenol at 230-240° C., and 3 mole percent of trimesic acid, based on the terephthalic acid in the polyester, is added. The mixture is stirred for two hours at that temperature, and the product is isolated by pouring into toluene.

Fibers are melt-spun and drafted by standard procedures. The fibers have improved affinity for basic dyes.

Films are extruded and drafted by the usual method. The films have improved adhesion for subs, coatings, and printing inks.

A copolyester made from 0.85 mole of terephthalic acid, 0.15 mole of isophthalic acid, and 1 mole of ethylene glycol is treated in the same way. The adhesive and dyeing properties of the resulting branched polyester are improved over those of the linear polyester.

EXAMPLE 8

A polyester having an I.V. of 1.2 is made from 0.5 mole of terephthalic acid; 0.5 mole of isophthalic acid; and 1.0 mole of 2,2-dimethyl-1,3-propanediol. A mixture of 100 grams of the linear polyester with 0.5 gram of hexa(carboxyethyl)cyclopentane is heated at 220-240° C. for one hour. The resulting branched, carboxylated polyester has excellent adhesion on metals, textiles, and leather.

The branched, carboxylated polyester is readily cross-linked by mixing with certain compounds as described below. Portions of the branched polyester, 10 grams dissolved in 30 grams of chloroform, and the following materials are added to the solution:

(a) 1.0 gram of Epon 828 (Shell Company) an epoxy resin sold by Shell Oil Company under the trade designation EPON 828 resin
(b) 0.5 gram of 2,4-tolylenediisocyanate
(c) 1.0 gram of partially etherified trimethylolmelamine
(d) 2.0 gram of phenol-formaldehyde resin, soluble type,
(e) 0.3 gram of magnesium oxide.

Coatings made on aluminum and steel panels are heated at 140-160° C. for fifteen minutes. The coatings have excellent adhesion and good resistance to solvents.

Cross-linked adhesive bonds can be made by the following process. Steel strips are coated with the solutions described above ((a) to (e)), and the solvent is evaporated at room temperature. Two strips coated with solution (a) are placed in contact with each other and heated in a press at 180-200° C. for ten minutes. A strong bond is formed. Similar results are obtained with the other solutions.

EXAMPLE 9

A linear polyester is made from 0.5 mole of 1,4-cyclohexanedicarboxylic acid, 0.5 mole of sebacic acid, and 1.0 mole of diethylene glycol. A mixture of 100 grams of the linear polyester; 3 grams of 4,2',4'-diphenylethertricarboxylic acid; 1 gram of toluenesulfonic acid; and 200 grams of tetrachloroethane is heated and stirred at 110-130° C. for five hours. The solution is heated under a vacuum at 100° C. to remove the solvent. The product is a viscous gum. Cross-linked coatings are made by mixing the polyester with epoxy compounds of diisocyanates.

EXAMPLE 10

A linear polyester is made having the composition 1.0 mole of 2,6-naphthalenedicarboxylic acid; 1.0 mole of 6-hydroxyhexanoic acid; and 1.0 mole of 2-methylhexanediol-1,6. The polyester has an I.V. of approximately 1.0.

A mixture of 100 grams of the linear polyester and 5 grams of 5-carboxymethoxyisophthalic acid is heated at 230-240° C. for two hours. The resulting branched polyester has excellent adhesion on metals.

EXAMPLE 11

A copolymer having an I.V. of 1.1 is made from 0.8 mole of terephthalic acid; 0.2 mole of isophthalic acid; and 1.0 mole of 1,4-cyclohenanedimethanol. A tetracarboxylic acid compound is made by heating 2 moles of trimellitic anhydride with 1 mole of decamethylene glycol. A mixture of 100 grams of the polyester and 10 grams of the tetracarboxylic acid compound is heated at 240-250° C. for one hour in 100 grams of o-phenyl phenol. The resulting branched, carboxylated polyester is isolated by pouring the solution into xylene. This polyester contains a relatively large amount of free carboxyl groups and can be mixed with non-carboxylated polyesters as a modifying agent. For example, one part of the carboxylated polyester (as granules) is mixed with two parts of a polyester made from terephthalic acid and 1,4-cyclohexanedimethanol. The mixture is extruded as a film. The film has improved adhesive properties, as compared to the unmodified polyester, for subs and decorative coatings.

Similar results are obtained by using a tricarboxylic compound made by heating 3 moles of succinic anhydride with 1 mole of trimethylolpropane.

EXAMPLE 12

A polyester having an I.V. of 0.96 is made from 1 mole of terephthalic acid; 0.6 mole of 1,4-cyclohexanedimethanol; and 0.4 mole of ethylene glycol. The polyester was stirred in the melt at 230–240° C. for 1.5 hours with 4 percent by weight of the polyester of a tetracarboxylic acid having the formula:

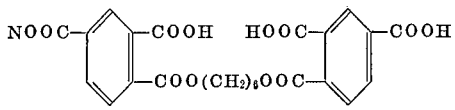

The product forms excellent bonds when used as a melt adhesive on the following substrates:
(a) iron to iron
(b) iron to aluminum
(c) aluminum to nylon 66
(d) cellulose triacetate to polyformaldehyde
(e) cotton fabric to leather
(f) zinc to polysulfone resin
(g) copper to poly(phenylene oxide) resin.

EXAMPLE 13 polyester is made from 0.7 mole of terephthalic acid; 0.3 mole of 1,4-cyclohexanedicarboxylic acid; and 1.0 mole of p-xylylene glycol. It is converted to a branched, carboxylated polyester by heating at 220° C. for 2 hours with 3 percent by weight of the polyester of 1,3,5-cyclohexanetricarboxylic acid. The product has excellent adhesion on poly(ethylene terephthalate) fabrics, natural rubber, synthetic rubber, acrylic fabrics, paper, wood, and nylon.

Similar properties are obtained when 1,3-cyclohexanedicarboxylic acid is used in place of the 1,4-isomer in the preparation of the linear polyester.

EXAMPLE 14

A polyester is made from 1.0 mole of terephthalic acid; 0.8 mole of 2,2,4,4-tetramethyl-1,3-cyclobutanediol; and 0.2 mole of tetramethylene glycol. It is heated with 2 percent by weight, based on the polyester, of 2,2,6,6-tetra(carboxyethyl)cyclohexanone, at 230° C. for 2.5 hours. The resulting branched polyester has excellent adhesion on aluminum and iron, and is valuable for bonding the seams of beverage cans.

A product having similar properties is obtained by using ethylene glycol in place of tetramethylene glycol.

Similar results are obtained when 2,4,2',4'-benzophenonetetracarboxylic acid or 4-phenyl-4-carboxypimelic acid are employed instead of 2,2,6,6-tetra(carboxyethyl)-cyclohexanone in the preparation of the branched polyester.

EXAMPLE 15

A polyester made from 4,4'-sulfonyldibenzoic acid and 2,2-dimethyl-1,3-propanediol is treated as described in Example 11. A branched, carboxylated polyester is obtained.

EXAMPLE 16

A polyester is made from 1 mole of terephthalic acid and 1 mole of quinitol. The polyester is reacted with a tetracarboxylic acid compound having the formula:

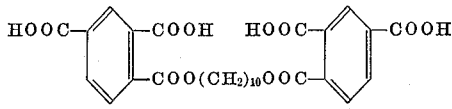

as described in Example 11, to result in a branched, carboxylated polyester. The polyester is of particular value as a bonding agent for food cans because it retains bonding strength at temperatures of 120–130° C.

EXAMPLE 17

A linear polyester is made from 1 mole of terephthalic acid and 1 mole of 2,5-norcamphanediol. This polyester is reacted with the tetracarboxylic acid compound of Example 16, as described in Example 11, to result in a branched polyester. The polyester is of particular value as a bonding agent for food cans because it retains bonding strength at temperatures of 120–130° C.

EXAMPLE 18

A polyester having an I.V. of 0.9 is prepared from 4-(2-hydroxyethoxy)benzoic acid. This polyester is reacted with 4 mole percent of trimesic acid as described in Example 11. The branched polyester produced thereby is useful as a melt adhesive for bonding metals.

As can be seen from the foregoing description and examples, this invention provides novel, fusible, high molecular weight, branched polyester containing terminal carboxyl groups and useful in various ways, such as adhesives, etc. In addition, this invention provides a novel process for the preparation of these fusible, high molecular weight, branched polyesters containing terminal carboxyl groups.

Although the invention has been described in considerable detail with reference to certain preferred embodiments thereof, it will be understood that variations and modifications can be effected within the scope and spirit of the invention as described hereinabove and as defined in the appended claims.

I claim:
1. A process for preparing a fusible, branched polyester, said process comprising reacting, under acidolysis conditions at a temperature in the range of from about 100° C. to about 320° C. until an equilibrium state is reached, a mixture consisting essentially of [A] a linear hydroxyl group terminated polyester having a molecular weight of at least 4,000 selected from the group consisting of (1) at least one glycol and at least one dicarboxylic acid, (2) at least one hydroxycarboxylic acid, or (3) a mixture of at least one glycol, at least one dicarboxylic acid, and at least one hydroxycarboxylic acid; and [B] at least one polycarboxylic acid having 3 to 6 carboxyl groups, said branched polyester having a molecular weight less than that of polyester [A] and containing branched molecules terminated with from 2 to 10 mole percent, based on the carboxylic acid in said linear polyester, of carboxyl groups, said branched molecules comprising at least 50 percent by weight of said branched polyester.

2. A fusible, branched polyester prepared according to the process as defined by claim 1 wherein the linear polyester is poly(ethylene terephthalate).

3. A fusible, branched polyester prepared according to the process as defined by claim 1 wherein the linear polyester is poly(1,4-cyclohexanedimethylene terephthalate).

4. A fusible, branched polyester prepared according to the process as defined by claim 1 wherein the linear polyester is a copolyester of terephthalic acid, isophthalic acid, and tetramethylene glycol.

5. A fusible, branched polyester prepared according to the process as defined by claim 1 wherein the polycarboxylic acid is trimesic acid.

6. A fusible, branched polyester prepared according to the process as defined by claim 1 wherein the linear polyester is a copolyester of an aromatic acid; 1,4-cyclohexanedimethanol; and 2,2,4,4-tetramethyl-1,3-cyclobutanediol.

7. A fusible, branched polyester as defined by claim 6 wherein the aromatic acid is terephthalic acid.

8. The product produced by the process of claim 1.

References Cited

UNITED STATES PATENTS

| | | | |
|---|---|---|---|
| 2,890,208 | 6/1959 | Young et al. | 260—78.3 |
| 2,895,946 | 7/1959 | Huffman | 260—75 |
| 2,952,879 | 9/1960 | Kitson et al. | 264—290 |
| 2,960,485 | 11/1960 | Bolton et al. | 260—22 |
| 3,048,565 | 8/1962 | Gall et al. | 260—75 |
| 3,122,451 | 2/1964 | Bunge et al. | 117—232 |
| 3,251,809 | 5/1966 | Lockwood et al. | 260—75 |
| 3,328,439 | 6/1967 | Hamilton | 260—410.9 |

FOREIGN PATENTS 1,278,284  10/1961  France.

WILLIAM H. SHORT, Primary Examiner

L. M. PHYNES, Assistant Examiner

U.S. Cl. X.R.

117—127, 138.8; 161—231, 232; 260—47, 835, 842